(12) United States Patent
Liu et al.

(10) Patent No.: US 8,561,812 B2
(45) Date of Patent: *Oct. 22, 2013

(54) BLEND POLYMER MEMBRANES COMPRISING THERMALLY REARRANGED POLYMERS DERIVED FROM AROMATIC POLYIMIDES CONTAINING ORTHO-POSITIONED FUNCTIONAL GROUPS

(75) Inventors: Chunqing Liu, Schaumburg, IL (US); Man-Wing Tang, Cerritos, CA (US)

(73) Assignee: UOP LLC, Des Plaines, IL (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/412,639

(22) Filed: Mar. 27, 2009

(65) Prior Publication Data

US 2010/0242723 A1    Sep. 30, 2010

(51) Int. Cl.
*B01D 71/62* (2006.01)

(52) U.S. Cl.
USPC ......... 210/500.39; 95/47; 95/50; 210/500.21; 528/310

(58) Field of Classification Search
USPC ........ 210/500.21, 500.39, 640, 653; 528/310; 95/47, 50
See application file for complete search history.

(56) References Cited

U.S. PATENT DOCUMENTS

| | | | |
|---|---|---|---|
| 3,133,132 A | 5/1964 | Loeb et al. | |
| 4,230,463 A | 10/1980 | Henis et al. | |
| 4,717,393 A | 1/1988 | Hayes | |
| 4,855,048 A | 8/1989 | Tang et al. | |
| 4,877,528 A | 10/1989 | Friesen et al. | |
| 5,409,524 A | 4/1995 | Jensvold et al. | |
| 5,679,131 A | 10/1997 | Obushenko | |
| 5,837,032 A | 11/1998 | Moll et al. | |
| 6,368,382 B1 | 4/2002 | Chiou | |
| 6,500,233 B1 | 12/2002 | Miller et al. | |
| 6,626,980 B2 | 9/2003 | Hasse et al. | |
| 6,663,805 B1 | 12/2003 | Ekiner et al. | |
| 6,896,717 B2 | 5/2005 | Pinnau et al. | |
| 6,955,712 B2 | 10/2005 | Yoon | |
| 7,048,846 B2 | 5/2006 | White et al. | |
| 7,052,793 B2 | 5/2006 | Formato et al. | |
| 7,166,146 B2 | 1/2007 | Miller et al. | |
| 7,485,173 B1 | 2/2009 | Liu et al. | |
| 2003/0150795 A1* | 8/2003 | Dorgan et al. ........... | 210/500.21 |
| 2004/0050250 A1 | 3/2004 | Pinnau et al. | |
| 2005/0268782 A1 | 12/2005 | Kulkarni et al. | |
| 2006/0138042 A1 | 6/2006 | Okamoto et al. | |
| 2007/0022877 A1 | 2/2007 | Marand et al. | |
| 2008/0300336 A1 | 12/2008 | Liu et al. | |
| 2009/0114089 A1 | 5/2009 | Liu et al. | |
| 2009/0277327 A1 | 11/2009 | Zhou et al. | |
| 2009/0277837 A1 | 11/2009 | Liu et al. | |
| 2009/0297850 A1 | 12/2009 | Jung et al. | |
| 2010/0133171 A1 | 6/2010 | Liu et al. | |
| 2010/0133186 A1 | 6/2010 | Liu et al. | |
| 2010/0133187 A1 | 6/2010 | Liu et al. | |
| 2010/0133192 A1 | 6/2010 | Liu et al. | |
| 2010/0137124 A1 | 6/2010 | Liu et al. | |
| 2010/0243567 A1 | 9/2010 | Liu et al. | |
| 2011/0072973 A1 | 3/2011 | Liu et al. | |
| 2011/0077312 A1 | 3/2011 | Liu et al. | |

FOREIGN PATENT DOCUMENTS

| | | |
|---|---|---|
| GB | 2211193 A | 6/1989 |
| JP | 2004231875 A | 8/2004 |
| KR | 100782959 B1 | 12/2007 |
| WO | WO 91/16123 | 10/1991 |

OTHER PUBLICATIONS

Park et al Supporting online material for polymers with cavities tuned for fast selective transport of small molecules and ions, Science, 318,254 Oct. 2007.*
U.S. Appl. No. 12/412,629, filed Mar. 27, 2009, Liu et al.
U.S. Appl. No. 12/412,633, filed Mar. 27, 2009, Liu et al.
U.S. Appl. No. 12/412,643, filed Mar. 27, 2009, Liu et al.
U.S. Appl. No. 12/412,647, filed Mar. 27, 2009, Liu et al.
U.S. Appl. No. 12/412,649, filed Mar. 27, 2009, Liu et al.
U.S. Appl. No. 12/412,653, filed Mar. 27, 2009, Liu et al.
Yaghi, Omar M. et al, Metal-organic frameworks: a new class of porous materials, Microporous & Mesoporous. Mater., 73: 3 (2004) pp. 3-14.
Barsema, J.N. et al., "Intermediate polymer to carbon gas separation membranes based on Matrimid PI", J. Membr. Science, 238: 93 (2004) pp. 93-102.
Yaghi, Omar M. et al., Systematic Design of Pore Size and Functionality in Isoreticular MOFs & Their Application in Methane Storage, Science, 295: 469 (2002).
Dybtsev, Danil N. et al., Rigid and Flexible: A Highly Porous Metal0Organic Framework with Unusaual Guest-Dependent Dynamic Behavior, Angew. Chem. Int. Ed., 43: 5033 (2004).

(Continued)

Primary Examiner — Gregory Listvoyb

(74) Attorney, Agent, or Firm — Mark Goldberg

(57) ABSTRACT

The present invention discloses blend polymer membranes comprising thermally rearranged polymers derived from aromatic polyimides containing ortho-positioned functional groups and methods for making and using these blend polymer membranes. The blend polymer membranes described in the current invention are prepared by heat treatment of blend polymer membranes comprising aromatic polyimides containing ortho-positioned functional groups such as —OH or —SH groups. In some instances, an additional crosslinking step is performed to improve the selectivity of the membrane. These blend polymer membranes have improved flexibility, reduced cost, improved processability, and enhanced selectivity and/or permeability compared to the comparable polymer membranes that comprise a single polymer.

8 Claims, No Drawings

(56) References Cited

OTHER PUBLICATIONS

Tullos, Gordon L. et al., "Thermal Conversion of Hydroxy-Containing Imides to Benzoxazoles: Polymer and Model Compound Study", Macromolecules, 32, 3598 (1999).
Ho Bum Park et al., "Polymers with Cavities Tuned for Fast Selective Transport of Small Molecules and Ions", Science, 318, 254 (2007).
Hsiao, "A new class of aromatic polybenzoxazoles containing ortho-phenylenedioxy groups", European Polymer Journal 40 (2004) 1127-1135.
Kim, "Gas permeation properties of polybenzoxazole membranes derived from the thermal rearrangement of poly (hydroxy amide)", The Membrane Society of Korea, 2007 Fall Conference, pp. 129-132.
U.S. Appl. No. 13/165,939, filed Jun. 22, 2011, Liu et al.
U.S. Appl. No. 13/329,365, filed Dec. 19, 2011, Liu et al.

* cited by examiner

BLEND POLYMER MEMBRANES COMPRISING THERMALLY REARRANGED POLYMERS DERIVED FROM AROMATIC POLYIMIDES CONTAINING ORTHO-POSITIONED FUNCTIONAL GROUPS

BACKGROUND OF THE INVENTION

This invention pertains to a new type of blend polymer membranes comprising thermally rearranged polymers derived from aromatic polyimides containing ortho-positioned functional groups and methods for making and using these blend polymer membranes. In some embodiments of the invention, the blend polymer membranes may be subjected to an additional crosslinking step to increase the selectivity of the membrane.

Membrane-based technologies have advantages of both low capital cost and high-energy efficiency compared to the much older and established techniques such as cryogenic distillation, absorption, and adsorption. Membranes, alone and in combinations with other methods, provide a comprehensive approach for solving energy, environmental resource recovery, medical, and many other technical problems. In the past 30-35 years, the state of the art of polymer membrane-based gas separation processes has evolved rapidly. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams. For example, UOP's Separex™ cellulose acetate polymeric membrane is currently an international market leader for carbon dioxide removal from natural gas. The drive towards greater economic and environmental efficient separations will result in more aggressive future growth in membrane-based separations.

The membranes most commonly used in commercial gas separation applications are polymeric and nonporous. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

Polymers provide a range of properties including low cost, good permeability, mechanical stability, and ease of processability that are important for gas separation. A polymer material with a high glass-transition temperature ($T_g$), high melting point, and high crystallinity is preferred. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. However, polymers which are more permeable are generally less selective than less permeable polymers. A general trade-off has always existed between permeability and selectivity (the so-called polymer upper bound limit). Over the past 30 years, substantial research effort has been directed to overcoming the limits imposed by this upper bound. Various polymers and techniques have been used, but without much success. In addition, traditional polymer membranes also have limitations in terms of thermal stability and contaminant resistance.

Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. For example, UOP's early field practice found that polymer membrane performance can deteriorate quickly. The primary cause of loss of membrane performance is liquid condensation on the membrane surface. Condensation is prevented by providing a sufficient dew point margin for operation, based on the calculated dew point of the membrane product gas. UOP's MemGuard™ system, a regenerable adsorbent system that uses molecular sieves, was developed to remove water as well as heavy hydrocarbons from the natural gas stream, hence, to lower the dew point of the stream. The selective removal of heavy hydrocarbons by a pretreatment system can significantly improve the performance of the membranes. Although these pretreatment systems can effectively remove heavy hydrocarbons from natural gas streams to lower their dew point, the cost is quite significant. Some projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Removal of the pretreatment system from the membrane system has great economical impact especially to offshore projects.

High-performance polymers such as polyimides (PIs), poly(trimethylsilylpropyne) (PTMSP), and polytriazole have been developed recently to improve membrane selectivity, permeability, and thermal stability. These polymeric membrane materials have shown promising properties for separation of gas pairs such as $CO_2/CH_4$, $O_2/N^2$, $H_2/CH_4$, and propylene/propane ($C_3H_6/C_3H_8$). However, current polymeric membrane materials have reached a limit in their productivity-selectivity trade-off relationship. In addition, gas separation processes based on the use of glassy solution-diffusion membranes frequently suffer from plasticization of the stiff polymer matrix by the sorbed penetrant molecules such as $CO_2$ or $C_3H_6$. Plasticization of the polymer as represented by the membrane structure swelling and significant increase in the permeabilities of all components in the feed occurs above the plasticization pressure when the feed gas mixture contains condensable gases.

Aromatic polybenzoxazoles (PBOs), polybenzothiazoles (PBTs), and polybenzimidazoles (PBIs) are ladderlike glassy polymers with flat, stiff, rigid-rod phenylene-heterocyclic ring units. The stiff, rigid ring units in such polymers pack efficiently, leaving very small penetrant-accessible free volume elements that are desirable for polymer membranes having both high permeability and high selectivity. These PBO, PBT, and PBI polymers with high thermal and chemical stability, however, have poor solubility in common organic solvents, preventing them from being used as common polymer materials for making polymer membranes by the most practical solvent casting method. Thermal conversion of aromatic polyimide membranes containing pendent functional groups ortho to the heterocyclic imide nitrogen in the polymer backbone to PBO, PBT, or PBI polymer membranes could provide an alternative method to generate PBO, PBT, or PBI polymer membranes that are difficult or impossible to obtain directly from PBO, PBT, or PBI polymers.

A recent publication in SCIENCE reported a new type of high permeability thermally rearranged polybenzoxazole polymer membranes for gas separations (Ho Bum Park et al, SCIENCE 318, 254 (2007)). The thermally rearranged polybenzoxazole membranes are prepared from high temperature heat treatment of hydroxy-containing polyimide polymer membranes containing pendent hydroxyl groups ortho to the heterocyclic imide nitrogen. These polybenzoxazole polymer membranes exhibited extremely high $CO_2$ permeability (>1000 Barrer) which is similar to that of some inorganic molecular sieve membranes but lower $CO_2/CH_4$ selectivity than that of some small pore inorganic molecular sieve membranes for $CO_2/CH_4$ separation.

The present invention discloses a new type of blend polymer membranes comprising thermally rearranged polymers derived from aromatic polyimides containing ortho-positioned functional groups and methods for making and using these blend polymer membranes. The new blend polymer membranes comprising thermally rearranged polymers have the advantages of low cost, easy processability, good flexibility, both high selectivity and high permeability (or permeance), high thermal stability, and stable flux and sustained selectivity over time by resistance to solvent swelling, plasticization and hydrocarbon contaminants.

SUMMARY OF THE INVENTION

This invention pertains to novel blend polymer membranes comprising thermally rearranged polymers derived from aromatic polyimides containing ortho-positioned functional groups and methods for making and using these blend polymer membranes.

The novel blend polymer membranes comprising thermally rearranged polymers derived from aromatic polyimides containing ortho-positioned functional groups described in the current invention are prepared by heat treatment of blend polymer membranes comprising aromatic polyimides containing ortho-positioned functional groups such as —OH or —SH groups. The aromatic polyimides containing ortho-positioned functional groups such as —OH or —SH groups undergo irreversible molecular rearrangement and convert to thermally rearranged polymers such as aromatic PBO (if the ortho-positioned functional groups are —OH groups) or PBT (if the ortho-positioned functional groups are —SH groups) during the heat treatment process.

In another embodiment of the invention, this invention pertains to blend polymer membranes that have undergone an additional crosslinking step, by chemical or UV crosslinking or other crosslinking process as known to one skilled in the art. The resulting cross-linked blend polymer membranes can be prepared by UV cross-linking of at least one polymer in a blend polymer membrane comprising at least one thermally rearranged polymer such as aromatic polybenzoxazole (PBO) or polybenzothiazole (PBT) polymer derived from an aromatic polyimide containing ortho-positioned functional groups. At least one polymer in this thermally rearranged polymer-comprising blend polymer membrane has UV cross-linkable functional groups such as benzophenone groups. The UV cross-linkable functional groups can be either in the thermally rearranged polymer such as aromatic PBO or PBT polymer or in the other different type of polymer in the thermally rearranged polymer-comprising blend polymer membrane. After UV cross-linking, the cross-linked blend polymer membrane comprises polymer chain segments where at least part of these polymer chain segments are cross-linked to each other through possible direct covalent bonds by exposure to UV radiation. The cross-linking of the blend polymer membranes comprising at least one thermally rearranged polymer such as aromatic PBO or PBT provides the membranes with superior selectivity and improved chemical and thermal stabilities compared to corresponding uncross-linked blend polymer membranes comprising at least one thermally rearranged polymer such as aromatic PBO or PBT.

The novel blend polymer membranes comprising thermally rearranged polymers derived from aromatic polyimides containing ortho-positioned functional groups have improved flexibility, reduced cost, improved processability, and enhanced selectivity and/or permeability compared to the pure thermally rearranged polymer membranes derived from aromatic polyimides containing ortho-positioned functional groups.

The present invention provides a method for the production of blend polymer membranes comprising thermally rearranged polymers by: 1) first synthesizing an aromatic polyimide comprising pendent functional groups (e.g., —OH or —SH) ortho to the heterocyclic imide nitrogen in the polymer backbone; 2) fabricating a blend polymer membrane from the aromatic polyimide containing ortho-positioned functional groups and another different polymer; and 3) converting the blend polymer membrane to a blend polymer membrane comprising a thermally rearranged polymer such as aromatic polybenzoxazole (PBO) or polybenzothiazole (PBT) polymer by heating between 300 and 600° C. under an inert atmosphere, such as argon, nitrogen, or vacuum. In some cases, the blend polymer membrane can then be converted to a high performance crosslinked blend polymer membrane by UV radiation or other crosslinking step. In addition, in some cases a membrane post-treatment step can be added after step 3) by coating the selective layer surface of the blend polymer membrane with a thin layer of high permeability material such as a polysiloxane, a fluoro-polymer, a thermally curable silicone rubber, or a UV radiation curable epoxy silicone.

The new blend polymer membranes comprising thermally rearranged polymers derived from aromatic polyimides containing ortho-positioned functional groups of the present invention can have either a nonporous or porous symmetric structure, an asymmetric structure having a thin nonporous or porous selective layer supported on top of a porous support layer with both layers made from the blend polymers comprising thermally rearranged polymer, or an asymmetric structure having a thin nonporous or porous selective layer made from the blend polymers comprising thermally rearranged polymer supported on top of a porous support layer made from a different polymer material or an inorganic material. The new blend polymer membranes comprising thermally rearranged polymers of the present invention can be fabricated into any convenient geometry such as flat sheet (or spiral wound), disk, tube, hollow fiber, or thin film composite.

The invention provides a process for separating at least one gas or liquid from a mixture of gases or liquids using the blend polymer membranes comprising thermally rearranged polymers described in the present invention, the process comprising: (a) providing a blend polymer membrane comprising thermally rearranged polymer which is permeable to said at least one gas or liquid; (b) contacting the mixture on one side of the blend polymer membrane comprising thermally rearranged polymer to cause said at least one gas or liquid to permeate the blend polymer membrane; and (c) removing from the opposite side of the membrane a permeate gas or liquid composition comprising a portion of said at least one gas or liquid which permeated said membrane.

The blend polymer membranes comprising thermally rearranged polymers of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

DETAILED DESCRIPTION OF THE INVENTION

In 1999, Tullos et al. reported the synthesis of a series of hydroxy-containing polyimide polymers containing pendent hydroxyl groups ortho to the heterocyclic imide nitrogen. These polyimides were found to undergo thermal conversion to polybenzoxazoles (PBOs) upon heating between 350 and 500° C. under nitrogen or vacuum. See Tullos et al, MACROMOLECULES, 32, 3598 (1999).

Aromatic polybenzoxazoles (PBOs), polybenzothiazoles (PBTs), and polybenzimidazoles (PBIs) are ladderlike glassy polymers with flat, stiff, rigid-rod phenylene-heterocyclic ring units. The stiff, rigid ring units in such polymers pack efficiently, leaving very small penetrant-accessible free volume elements with well-connected morphology that are desirable for polymer membranes having both high permeability and high selectivity. These PBO, PBT, and PBI polymers with high thermal and chemical stability, however, have poor solubility in common solvents, preventing them from being used as common polymer materials for making polymer membranes by the most practical solvent casting method. Thermal conversion of aromatic polyimide membranes containing pendent functional groups ortho to the heterocyclic imide nitrogen in the polymer backbone to PBO, PBT, or PBI polymer membranes could provide an alternative method for generating PBO, PBT, or PBI polymer membranes that are difficult or impossible to obtain directly from PBO, PBT, or PBI polymers.

A recent publication in Science reported a study on preparing thermally rearranged PBO polymer membranes from aromatic polyimide membranes containing pendent —OH groups ortho to the heterocyclic imide nitrogen in the polymer backbone by irreversible molecular rearrangement at about 350-450° C. See Ho Bum Park et al, SCIENCE, 318, 254 (2007). These thermally rearranged PBO polymer membranes exhibited extremely high $CO_2$ permeability (>1000 Barrer) which is similar to that of some inorganic molecular sieve membranes but lower $CO_2/CH_4$ selectivity than that of some small pore inorganic molecular sieve membranes for $CO_2/CH_4$ separation.

The present invention involves novel blend polymer membranes comprising thermally rearranged polymers derived from aromatic polyimides containing ortho-positioned functional groups and methods for making and using these blend polymer membranes. In some embodiments of the invention, the blend polymer membranes may be subjected to an additional crosslinking step to increase the selectivity of the membrane.

The term "blend polymer membrane" in the present invention refers to a membrane prepared from a blend of two or more polymers. The blend polymer membrane comprising thermally rearranged polymer derived from aromatic polyimide containing ortho-positioned functional groups described in the present invention contains a blend of two or more polymers wherein at least one polymer is a thermally rearranged polymer such as polybenzoxazole (PBO) or polybenzothiazole (PBT) polymer derived from an aromatic polyimide containing ortho-positioned functional groups such as —OH or —SH groups. The aromatic polyimides containing ortho-positioned functional groups such as —OH or —SH groups undergo irreversible molecular rearrangement and convert to thermally rearranged polymers such as aromatic PBO (if the ortho-positioned functional groups are —OH groups) or PBT (if the ortho-positioned functional groups are —SH groups) during the heat treatment process.

In some cases, it is desirable to cross-link the blend polymer membrane to improve the membrane selectivity. The cross-linked blend polymer membrane described in the current invention is prepared by UV cross-linking of at least one polymer in a blend polymer membrane comprising at least one thermally rearranged polymer derived from aromatic polyimide containing ortho-positioned functional groups. At least one polymer in the thermally rearranged polymer-comprising blend polymer membrane has UV cross-linkable functional groups such as benzophenone groups. The UV cross-linkable functional groups can be either in the thermally rearranged polymer such as PBO or PBT polymer or in the other different type of polymer in the thermally rearranged polymer-comprising blend polymer membrane. After UV cross-linking, the cross-linked blend polymer membrane comprises polymer chain segments wherein at least part of these polymer chain segments are cross-linked to each other through possible direct covalent bonds by exposure to UV radiation. The cross-linking of the blend polymer membranes offers the membranes superior selectivity and improved chemical and thermal stabilities than the corresponding uncross-linked blend polymer membranes comprising at least one thermally rearranged polymer such as aromatic PBO or PBT.

The blend polymer membranes comprising thermally rearranged polymers derived from aromatic polyimides containing ortho-positioned functional groups have improved flexibility, reduced cost, improved processability, and enhanced selectivity and/or permeability compared to the corresponding pure thermally rearranged polymer membranes derived from aromatic polyimides containing ortho-positioned functional groups. In addition, the blend polymer membranes comprising thermally rearranged polymers have high thermal and chemical stability, and stable flux and sustained selectivity over time by resistance to solvent swelling, plasticization and hydrocarbon contaminants.

The present invention provides a method for the preparation of blend polymer membranes comprising thermally rearranged polymers by: 1) first synthesizing an aromatic polyimide comprising pendent functional groups (e.g., —OH or —SH) ortho to the heterocyclic imide nitrogen in the polymer backbone; 2) fabricating a blend polymer membrane from the aromatic polyimide containing ortho-positioned functional groups and another different glassy polymer; and 3) converting the blend polymer membrane to a blend polymer membrane comprising a thermally rearranged polymer such as aromatic polybenzoxazole (PBO) or polybenzothiazole (PBT) polymer by heating between 300 and 600° C. under an inert atmosphere, such as argon, nitrogen, or vacuum. In some cases, the blend polymer membrane can then be converted to a high performance crosslinked blend polymer membrane by UV radiation or other crosslinking step. In addition, in some cases a membrane post-treatment step can be added after step 3) by coating the selective layer surface of the blend polymer membrane with a thin layer of high permeability material such as a polysiloxane, a fluoro-polymer, a thermally curable silicone rubber, or a UV radiation curable epoxy silicone.

The aromatic polyimides comprising pendent functional groups (e.g., —OH or —SH) ortho to the heterocyclic imide nitrogen in the polymer backbone that are used for the preparation of the blend polymer membranes comprising thermally rearranged polymers derived from the aromatic polyimides containing ortho-positioned functional groups in the present invention comprise a plurality of first repeating units of a formula (I), wherein said formula (I) is:

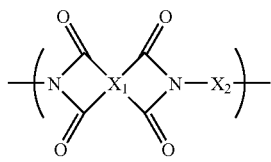
(I)

where —X$_1$— of said formula (I) is selected from the group consisting of

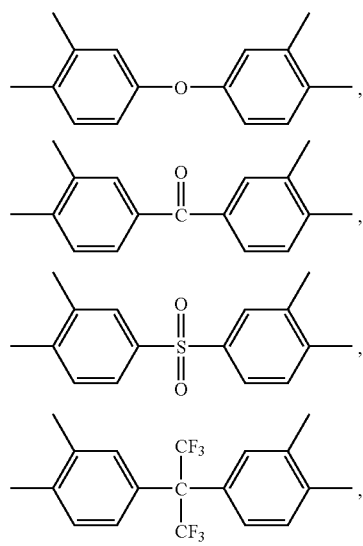

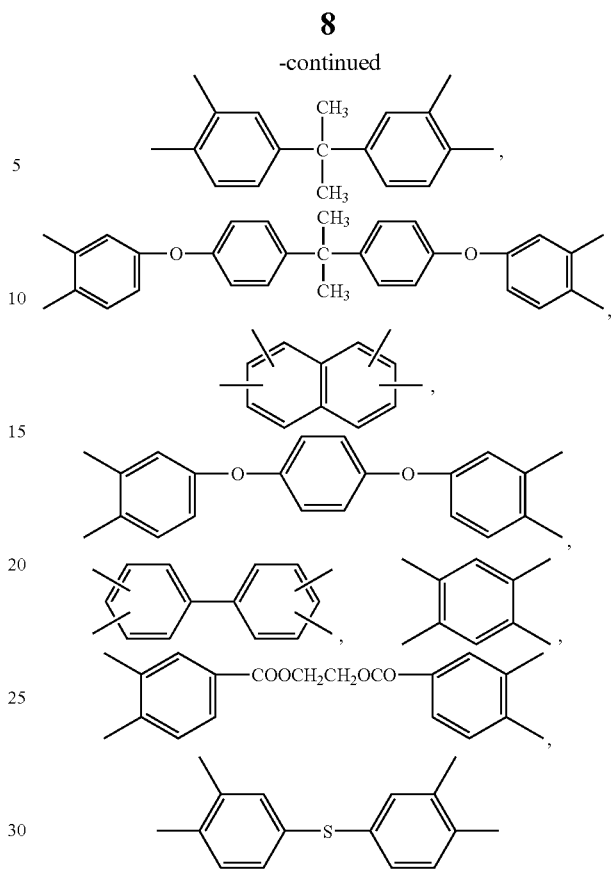

and mixtures thereof, —X$_2$— of said formula (I) is selected from the group consisting of

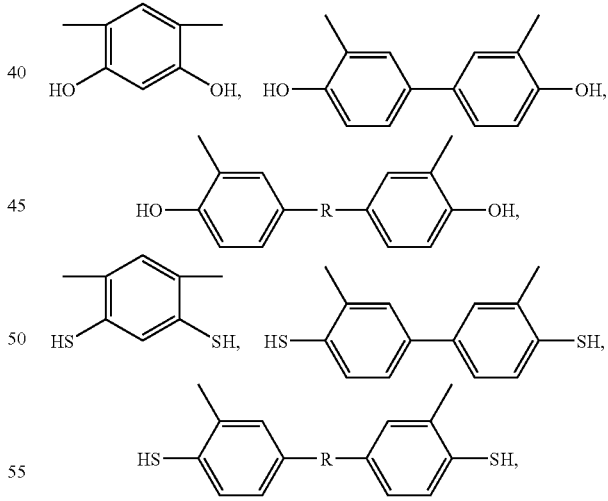

and mixtures thereof, and —R— is selected from the group consisting of

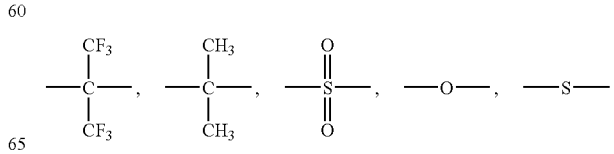

and mixtures thereof.

When the blend polymer membrane is to be subjected to a crosslinking step, it is necessary that the polymers in the blend polymer membrane have cross-linkable functional groups such as UV cross-linkable functional groups. For example, to convert a blend polymer membrane to a high performance crosslinked blend polymer membrane by UV radiation, and if the second polymer in the blend polymer membrane does not have UV cross-linkable functional groups, the aromatic polyimide containing ortho-positioned functional groups (e.g., —OH or —SH) should be selected from a polyimide with formula (I) and possessing UV cross-linkable functional groups such as carbonyl (—CO—) groups, wherein $X_1$ of formula (I) is a moiety having a composition of

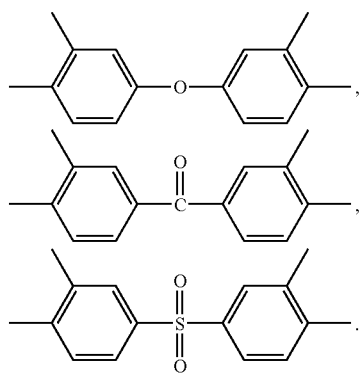

or mixtures thereof.

When the second polymer in the blend polymer membrane comprising aromatic polyimide containing ortho-positioned functional groups in the present invention has UV cross-linkable functional groups, the aromatic polyimide containing ortho-positioned functional groups (e.g., —OH or —SH) does not need to have UV cross-linkable functional groups and can be selected from any of polyimides with formula (I).

Some preferred aromatic polyimides comprising pendent functional groups (e.g., —OH or —SH) ortho to the heterocyclic imide nitrogen in the polymer backbone that are used for the preparation of the blend polymer membranes comprising thermally rearranged polymers derived from the aromatic polyimides containing ortho-positioned functional groups in the present invention include, but are not limited to, poly[2,2'-bis-(3,4-dicarboxyphenyl) hexafluoropropane dianhydride-2,2-bis(3-amino-4-hydroxyphenyl)-hexafluoropropane] (poly(6FDA-APAF)), poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly(BTDA-HAB)), poly[4,4'-oxydiphthalic anhydride-2,2-bis(3-amino-4-hydroxyphenyl)-hexafluoropropane] (poly(ODPA-APAF)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-3,3'-dihydroxy-4,4'-diamino-biphenyl) (poly(DSDA-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), poly[2,2'-bis-(3,4-dicarboxyphenyl) hexafluoropropane dianhydride-3,3'-dihydroxy-4,4'-diamino-biphenyl] (poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The aromatic polyimides comprising pendent functional groups (e.g., —OH or —SH) ortho to the heterocyclic imide nitrogen in the polymer backbone that are used for the preparation of the blend polymer membranes comprising thermally rearranged polymers derived from the aromatic polyimides containing ortho-positioned functional groups in the present invention are synthesized from diamines and dianhydrides in polar solvents such as 1-methyl-2-pyrrolidone (NMP) or N,N-dimethylacetamide (DMAc) by a two-step process involving the formation of the poly(amic acid)s followed by a solution imidization or a thermal imidization. Acetic anhydride is used as the dehydrating agent and pyridine (or triethylamine) is used as the imidization catalyst for the solution imidization reaction.

The second glassy polymer in the blend polymer membrane comprising aromatic polyimide containing ortho-positioned functional groups as described in the current invention is different from the aromatic polyimide containing ortho-positioned functional groups and selected from a low cost, easily processable glassy polymer with a high glass transition temperature (Tg). It is preferred that the second glassy polymer in the blend polymer membrane exhibits a carbon dioxide over methane selectivity of at least 8, more preferably at least 10 at 50° C. under 690 kPa (100 psig) pure carbon dioxide or methane pressure.

The second glassy polymer in the blend polymer membrane comprising aromatic polyimide containing ortho-positioned functional groups as described in the current invention can be selected from, but is not limited to, polysulfones; sulfonated polysulfones; polyethersulfones; sulfonated polyethersulfones; polyvinylpyrrolidones; polyetherimides such as Ultem (or Ultem 1000) sold under the trademark Ultem®, manufactured by GE Plastics; cellulosic polymers, such as cellulose acetate and cellulose triacetate; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), and poly(phenylene terephthalate); polysulfides; polymers from monomers having alpha-olefinic unsaturation in addition to those polymers previously listed including poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole);

polyhydrazides; polyoxadiazoles; polytriazoles; polycarbodiimides; polyphosphazines; polymers of intrinsic microporosity; and interpolymers, including block interpolymers containing repeating units from the above polymers such as interpolymers of acrylonitrile-vinyl bromide-sodium salt of para-sulfophenylmethallyl ethers; and grafts and blends containing any of the foregoing polymers. Typical substituents providing substituted polymers include halogens such as fluorine, chlorine and bromine; hydroxyl groups; lower alkyl groups; lower alkoxy groups; monocyclic aryl; and lower acryl groups.

Some preferred glassy polymers used in the blend polymer membrane but different from the aromatic polyimide containing ortho-positioned functional groups as described in the current invention include, but are not limited to, polysulfones, sulfonated polysulfones, polyethersulfones, sulfonated polyethersulfones, polyetherimides such as Ultem (or Ultem 1000) sold under the trademark Ultem®, manufactured by GE Plastics, and available from GE Polymerland, cellulosic polymers such as cellulose acetate and cellulose triacetate, polyamides; polyimides such as Matrimid sold under the trademark Matrimid® by Huntsman Advanced Materials (Matrimid® 5218 refers to a particular polyimide polymer sold under the trademark Matrimid®), P84 or P84HT sold under the tradename P84 and P84HT respectively from HP Polymers GmbH, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA)), poly[2,2'-bis-(3,4-dicarboxyphenyl) hexafluoropropane dianhydride-1,3-phenylenediamine] (poly(6FDA-m-PDA)), poly[2,2'-bis-(3,4-dicarboxyphenyl) hexafluoropropane dianhydride-1,3-phenylenediamine-3,5-diaminobenzoic acid)] (poly(6FDA-m-PDA-DABA)); polyamide/imides; polyketones, polyether ketones; polyvinylpyrrolidones; and polymers of intrinsic microporosity.

The most preferred glassy polymers used in the blend polymer membrane but different from the aromatic polyimide containing ortho-positioned functional groups as described in the current invention include, but are not limited to, polyimides such as Matrimid®, P84®, poly(BTDA-PMDA-TMMDA), poly(BTDA-PMDA-ODPA-TMMDA), poly(DSDA-TMMDA), poly(BTDA-TMMDA), or poly(DSDA-PMDA-TMMDA), polyetherimides such as Ultem®, polysulfones, polyethersulfones, polyvinylpyrrolidones, and polymers of intrinsic microporosity.

The blend polymer membrane comprising the aromatic polyimide containing ortho-positioned functional groups described in the present invention can have either a nonporous or porous symmetric structure, an asymmetric structure having a thin nonporous or porous selective layer supported on top of a porous support layer with both layers made from the blend polymers, or an asymmetric structure having a thin nonporous or porous selective layer made from the blend polymers supported on top of a porous support layer made from a different polymer material or an inorganic material. The new blend polymer membranes comprising the aromatic polyimide containing ortho-positioned functional groups of the present invention can be fabricated into any convenient geometry such as flat sheet (or spiral wound), disk, tube, hollow fiber, or thin film composite.

The blend polymer membrane comprising the aromatic polyimide containing ortho-positioned functional groups described in the present invention can be fabricated into a nonporous symmetric thin film geometry by casting a homogeneous blend polymer solution comprising an aromatic polyimide containing ortho-positioned functional groups and another different polymer such as polyethersulfone on top of a clean glass plate and allowing the solvent to evaporate slowly for at least 12 hours at room temperature. The membrane is then detached from the glass plate and dried at room temperature for 24 hours and then at 200° C. for at least 48 hours under vacuum.

The solvents used for dissolving the aromatic polyimide containing ortho-positioned functional groups and the other different polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, others known to those skilled in the art and mixtures thereof.

The blend polymer membrane comprising the aromatic polyimide containing ortho-positioned functional groups described in the present invention can also be fabricated by a method comprising the steps of: dissolving the aromatic polyimide containing ortho-positioned functional groups and another different polymer such as polyethersulfone or polyvinylpyrrolidone in a solvent to form a blend polymer solution; contacting a porous membrane support (e.g., a support made from inorganic ceramic material) with said blend polymer solution; and evaporating the solvent to provide a thin selective layer comprising the aromatic polyimide containing ortho-positioned functional groups and the other different polymer on the supporting layer.

The blend polymer membrane comprising the aromatic polyimide containing ortho-positioned functional groups described in the present invention can also be fabricated as an asymmetric membrane with flat sheet or hollow fiber geometry by phase inversion followed by direct air drying through the use of at least one drying agent which is a hydrophobic organic compound such as a hydrocarbon or an ether (see U.S. Pat. No. 4,855,048). The blend polymer membrane comprising the aromatic polyimide containing ortho-positioned functional groups described in the present invention can also be fabricated as an asymmetric membrane with flat sheet or hollow fiber geometry by phase inversion followed by solvent exchange methods (see U.S. Pat. No. 3,133,132).

The blend polymer membrane comprising the aromatic polyimide containing ortho-positioned functional groups described in the present invention is then thermally converted to a blend polymer membrane comprising a thermally rearranged polymer such as aromatic polybenzoxazole (PBO) or polybenzothiazole (PBT) polymer by heating between 300 and 600° C. under an inert atmosphere, such as argon, nitrogen, or vacuum. During this thermal conversion process, the aromatic polyimide containing ortho-positioned functional groups in the blend polymer membrane is converted to the thermally rearranged polymer such as PBO (if the aromatic polyimide containing ortho-positioned —OH functional groups), or PBT (if the aromatic polyimide containing ortho-positioned —SH functional groups) polymer comprising repeating units of a formula (II), wherein said formula (II) is:

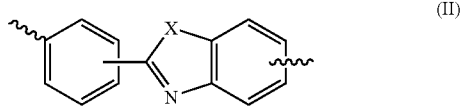

(II)

where X of said formula (II) is O for polybenzoxazoles or S for polybenzothiazoles.

In some cases a membrane post-treatment step can be added after the thermal conversion step by coating the selective layer surface of the blend polymer membrane comprising a thermally rearranged polymer with a thin layer of high permeability material such as a polysiloxane, a fluoro-polymer, a thermally curable silicone rubber, or a UV radiation curable epoxy silicone. The coating filling the surface pores and other imperfections comprising voids (see U.S. Pat. No. 4,230,463; U.S. Pat. No. 4,877,528; U.S. Pat. No. 6,368,382).

The final blend polymer membranes comprising thermally rearranged polymers derived from aromatic polyimides containing ortho-positioned functional groups described in the present invention can have either a nonporous or porous symmetric structure, an asymmetric structure having a thin nonporous or porous selective layer supported on top of a porous support layer with both layers made from the blend polymers, or an asymmetric structure having a thin nonporous or porous selective layer made from the blend polymers supported on top of a porous support layer made from a different polymer material or an inorganic material. The new blend polymer membranes comprising thermally rearranged polymers derived from aromatic polyimides containing ortho-positioned functional groups of the present invention can be fabricated into any convenient geometry such as flat sheet (or spiral wound), disk, tube, hollow fiber, or thin film composite.

The current invention provides a process for separating at least one gas or liquid from a mixture of gases or liquids using the new blend polymer membranes comprising thermally rearranged polymers derived from aromatic polyimides containing ortho-positioned functional groups of the present invention, the process comprising: (a) providing a blend polymer membrane comprising thermally rearranged polymer which is permeable to said at least one gas or liquid; (b) contacting the mixture on one side of the blend polymer membrane comprising thermally rearranged polymer to cause said at least one gas or liquid to permeate the blend polymer membrane comprising thermally rearranged polymer; and (c) removing from the opposite side of the membrane a permeate gas or liquid composition comprising a portion of said at least one gas or liquid which permeated said membrane.

The blend polymer membranes comprising thermally rearranged polymers such as PBOs or PBTs of the present invention are especially useful in the purification, separation or adsorption of a particular species in the liquid or gas phase. In addition to separation of pairs of gases, these blend polymer membranes comprising thermally rearranged polymers such as PBOs or PBTs may, for example, be used for the desalination of water by reverse osmosis or for the separation of proteins or other thermally unstable compounds, e.g. in the pharmaceutical and biotechnology industries. The blend polymer membranes comprising thermally rearranged polymers such as PBOs or PBTs may also be used in fermenters and bioreactors to transport gases into the reaction vessel and transfer cell culture medium out of the vessel. Additionally, the blend polymer membranes comprising thermally rearranged polymers such as PBOs or PBTs may be used for the removal of microorganisms from air or water streams, water purification, ethanol production in a continuous fermentation/membrane pervaporation system, and in detection or removal of trace compounds or metal salts in air or water streams.

The blend polymer membranes comprising thermally rearranged polymers such as PBOs or PBTs of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, to carbon dioxide and methane, hydrogen and methane or carbon monoxide, helium and methane, can be separated using the blend polymer membranes comprising thermally rearranged polymers such as PBOs or PBTs described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 100° C. More preferably, the effective operating temperature of the membranes of the present invention will range from: about −20° to about 70° C., and most preferably, the effective operating temperature of the membranes of the present invention will be less than about 70° C.

The blend polymer membranes comprising thermally rearranged polymers such as PBOs or PBTs described in the current invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these blend polymer membranes comprising thermally rearranged polymers such as PBOs or PBTs may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for is gasoline recovery. The blend polymer membranes comprising thermally rearranged polymers such as PBOs or PBTs may incorporate a species that adsorbs strongly to certain gases (e.g. cobalt porphyrins or phthalocyanines for $O_2$ or silver(I) for ethane) to facilitate their transport across the membrane.

The blend polymer membranes comprising thermally rearranged polymers such as PBOs or PBTs can also be operated at high temperature to provide the sufficient dew point margin for natural gas upgrading (e.g, $CO_2$ removal from natural gas). The blend polymer membranes comprising thermally rearranged polymers such as PBOs or PBTs can be used in either a single stage membrane or as the first or/and second stage membrane in a two stage membrane system for natural gas upgrading. The blend polymer membranes comprising thermally rearranged polymers such as PBOs or PBTs with high selectivity, high permeance, and high thermal and chemical stabilities of the present invention allows the membranes to be operated without a costly pretreatment system. Hence, a costly membrane pretreatment system such as a MemGuard™ system will not be required in the new process containing the blend polymer membrane comprising thermally rearranged polymer such as PBO or PBT. Due to the elimination of the pretreatment system and the significant reduction of membrane area, the new process can achieve significant capital cost saving and reduce the existing membrane footprint.

These blend polymer membranes comprising thermally rearranged polymers such as PBOs or PBTs may also be used in the separation of liquid mixtures by pervaporation, such as in the removal of organic compounds (e.g., alcohols, phenols, chlorinated hydrocarbons, pyridines, ketones) from water such as aqueous effluents or process fluids. A blend polymer membrane comprising thermally rearranged polymer such as PBO or PBT which is ethanol-selective would be used to increase the ethanol concentration in relatively dilute ethanol solutions (5-10% ethanol) obtained by fermentation processes. Another liquid phase separation example using these blend polymer membranes comprising thermally rearranged polymers such as PBOs or PBTs is the deep desulfurization of gasoline and diesel fuels by a pervaporation membrane process similar to the process described in U.S. Pat. No. 7,048, 846, incorporated by reference herein in its entirety. The blend polymer membranes comprising thermally rearranged polymers such as PBOs or PBTs that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the blend polymer membrane include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The blend polymer membranes comprising thermally rearranged polymers such as PBOs or PBTs may be used for separation of organic molecules from water (e.g. ethanol and/or phenol from water by pervaporation) and removal of metal and other organic compounds from water.

The blend polymer membranes comprising thermally rearranged polymers such as PBOs or PBTs described in the current invention have immediate applications for the separation of gas mixtures including carbon dioxide removal from natural gas. The blend polymer membranes comprising thermally rearranged polymers such as PBOs or PBTs permit carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membranes, and methane enriches on the feed (or reject) side of the membranes.

An additional application of the blend polymer membranes comprising thermally rearranged polymers such as PBOs or PBTs is as the separator in chemical reactors to enhance the yield of equilibrium-limited reactions by selective removal of a specific byproduct or product.

Yet another application of the new blend polymer membranes comprising thermally rearranged polymers such as PBOs or PBTs described in the current invention is as the catalytic polymeric membranes by loading metal catalysts or polymer-anchored metal catalysts, or molecular sieve catalysts to the blend polymer membranes comprising thermally rearranged polymers such as PBOs or PBTs. These new catalyst-loaded blend polymer membranes comprising thermally rearranged polymers such as PBOs or PBTs are suitable for a variety of catalysis applications that are of interest to UOP's catalysis business such as selective hydrogenation reactions to remove feed or product impurities, solid acid motor fuel alkylation (alkylene), ethylbenzene and cumene alkylation, detergent alkylation, $C_3$-$C_5$ light olefin oligomerization, Tatoray™, and selective ethyl benzene conversion to paraxylene. The control of adsorption and diffusion properties by tailoring the characteristics of the thermally rearranged polymer material and the other polymer material in the blend polymer membrane and the catalyst components can greatly improve process efficiency that can only be achieved in systems of liquid acids or bases, where great efficiency is achieved via great partition of one reactant relative to others or the reactants relative to product. The blend polymer membranes comprising thermally rearranged polymers such as PBOs or PBTs described in the current invention possess many advantages over traditional catalysts for the above-mentioned catalysis applications.

As an example, the advantages of these new blend polymer membranes comprising thermally rearranged polymers such as PBOs or PBTs for selective hydrogenation reactions such as selective hydrogenation of propadiene and propyne and selective hydrogenation of butadiene include: 1) taking advantage of the catalytic membrane reactor concept by combining chemical reactions with the catalytic and separation activities of the membranes; 2) controllable $H_2$ concentration; 3) adjustable $H_2$/feed ratio, etc. These advanced characteristics will improve the reaction yield and selectivity simultaneously for selective hydrogenation reactions.

Yet another application of the new blend polymer membranes comprising thermally rearranged polymers such as PBOs or PBTs described in the current invention is as the novel efficient proton-conducting membrane for fuel cell application. The development of efficient proton-conducting membrane is of the greatest importance for the design and improvement of low-temperature fuel cells including proton exchange membrane fuel cells (PEMFCs) and direct methanol fuel cells (DMFCs). PEMFC is one of the most attractive power sources for a variety of applications by virtue of its high efficiency and environment friendly nature. During the past two decades most of the activity in the field of proton-conducting membranes has been undertaken by the materials science community whose major motivation has been to develop suitable proton conducting materials for application as proton conducting membranes for fuel cells. The breakthrough of the PEMFC and DMFC technologies has been however still inhibited, mainly due to the lack of suitable materials for proton-conducting membrane applications. Optimized proton and water transport properties of the membrane are crucial for efficient fuel cell operation. Dehydration of the membrane reduces proton conductivity while excess of water can lead to flooding of the electrodes, both conditions may result in poor cell performance.

The new blend polymer membranes comprising thermally rearranged polymers such as PBOs or PBTs described in the current invention are expected to exhibit significantly improved performance as proton-conducting membranes for fuel cell applications compared to traditional Nafion® polymer membranes because of their excellent proton conducting property, high water adsorption capacity, and high chemical and thermal stability.

In summary, the blend polymer membranes comprising thermally rearranged polymers such as PBOs or PBTs derived from aromatic polyimides containing ortho-positioned functional groups of the present invention are not only suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, $H_2S/CH_4$, olefin/paraffin, iso/normal paraffins separations, and other light gas mixture separations, but also can be used for other applications such as for catalysis and fuel cell applications.

EXAMPLES

The following examples are provided to illustrate one or more preferred embodiments of the invention, but are not limited embodiments thereof. Numerous variations can be made to the following examples that lie within the scope of the invention.

Example 1

Synthesis of Poly(6FDA-HAB) Polyimide

The aromatic poly[2,2'-bis-(3,4-dicarboxyphenyl) hexafluoropropane dianhydride-3,3'-dihydroxy-4,4'-diamino-biphenyl] (poly(6FDA-HAB)) polyimide containing pendent —OH functional groups ortho to the heterocyclic imide nitrogen in the polymer backbone was synthesized from 2,2'-bis-(3,4-dicarboxyphenyl) hexafluoropropane dianhydride (6FDA) and 3,3'-dihydroxy-4,4'-diamino-biphenyl (HAB) in NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 5.9 g (27.3 mmol) of HAB and 40 mL of NMP. Once HAB was fully dissolved, a solution of 6FDA (12.1 g, 27.3 mmol) in 40 µL of NMP was added to the HAB solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 hour at 80° C. to yield the poly(6FDA-HAB) polyimide. The poly(6FDA-HAB) polyimide product in a fine fiber form was recovered by slowly precipitating the reaction mixture into a large amount of methanol. The resultant poly(6FDA-HAB) polyimide fibers were then thoroughly rinsed with methanol and dried in a vacuum oven at 150° C. for 24 hours.

Example 2

Preparation of Blend Polymer Membrane from Poly(6FDA-HAB) Polyimide and Polyethersulfone (PES) (Abbreviated as Poly(6FDA-HAB)/PES)

The poly(6FDA-HAB)/PES blend polymer membrane was prepared as follows: 3.0 g of poly(6FDA-HAB) polyimide synthesized in Example 1 and 1.5 g of polyethersulfone (PES, purchased from BASF Corporation) were dissolved in a solvent mixture of 12.0 g of NMP and 12.0 g of 1,3-dioxolane. The mixture was mechanically stirred for 2 hours to form a homogeneous casting dope. The resulting homogeneous casting dope was allowed to degas overnight. The poly(6FDA-HAB)/PES blend polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(6FDA-HAB)/PES blend polymer membrane.

Example 3

Preparation of Polybenzoxazole/PES Blend Polymer Membranes (PBO(6FDA-HAB)/PES-450C and PBO(6FDA-HAB)/PES-400C) from Poly(6FDA-HAB)/PES Blend Polymer Membrane by Heat Treatment The poly(6FDA-HAB)/PES blend polymer membrane was thermally heated from 50° C. to 400° C. or 450° C. at a heating rate of 5° C./min under $N_2$ flow. The membrane was hold for 1 hour at 400° C. (to make PBO(6FDA-HAB)/PES-400C blend polymer membrane) or 450° C. (to make PBO(6FDA-HAB)/PES-450C blend polymer membrane) and then cooled down to 50° C. at a heating rate of 5° C./min under $N_2$ flow to yield polybenzoxazole/PES blend polymer membranes (PBO(6FDA-HAB)/PES-400C and PBO(6FDA-HAB)/PES-450C).

Example 4

Preparation of Poly(6FDA-HAB) Pure Polyimide Membrane

The poly(6FDA-HAB) pure polymer membrane was prepared as follows: 4.0 g of poly(6FDA-HAB) polyimide synthesized in Example 1 was dissolved in a solvent mixture of 12.0 g of NMP and 12.0 g of 1,3-dioxolane. The mixture was mechanically stirred for 2 hours to form a homogeneous casting dope. The resulting homogeneous casting dope was allowed to degas overnight. The poly(6FDA-HAB) pure polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(6FDA-HAB) pure polymer membrane.

Example 5

Preparation of Polybenzoxazole Polymer Membrane (PBO(6FDA-HAB)-450C) from Poly(6FDA-HAB) Pure Polymer Membrane by Heat Treatment The poly(6FDA-HAB) pure polymer membrane was thermally heated from 50° C. to 450° C. at a heating rate of 5° C./min under $N_2$ flow. The membrane was hold for 1 hour at 450° C. and then cooled down to 50° C. at a heating rate of 5° C./min under $N_2$ flow to yield polybenzoxazole pure polymer membrane (PBO(6FDA-HAB)-450C).

Example 6

$CO_2/CH_4$ Separation Performance of PBO(6FDA-HAB)/PES-450C Blend Polymer Membrane and PBO(6FDA-HAB)-450C Pure Polymer Membrane The PBO(6FDA-HAB)/PES-450C blend polymer membrane and PBO(6FDA-HAB)-450C pure polymer membrane were tested for $CO_2/CH_4$ separation under testing pressure of 690 kPa (100 psig) and temperature of 50° C. (Table 1). The PBO(6FDA-HAB)-450C pure polymer membrane was very brittle and showed no selectivity for $CO_2/CH_4$ separation due to the formation of cracks and defects under the testing pressure. The PBO(6FDA-HAB)/PES-450C blend polymer membrane is more flexible than the PBO(6FDA-HAB)-450C pure polymer membrane and showed very high $CO_2$ permeability ($P_{CO2}$=540 Barrer at 50° C. testing temperature) and good $CO_2/CH_4$ selectivity (20 at 50° C. testing temperature). This result suggests that the introduction of a certain amount of non-PBO polymer to the PBO polymer membrane improves the membrane flexibility and processability.

TABLE 1

Pure gas permeation test results of PBO(6FDA-HAB)/PES-450C blend polymer membrane and PBO(6FDA-HAB)-450C pure polymer membrane for $CO_2/CH_4$ Separation[a]

| Membrane | $P_{CO2}$ (Barrer) | $\alpha_{CO2/CH4}$ |
|---|---|---|
| PBO(6FDA-HAB)-450C | leaky | |
| PBO(6FDA-HAB)-450C | leaky | |
| PBO(6FDA-HAB)/PES-450C | 539.5 | 20.0 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Example 7

Preparation of Cross-Linked Polybenzoxazole/PES Blend Polymer Membrane (Cross-Linked PBO (6FDA-HAB)/PES-450C) from PBO(6FDA-HAB)/PES-450C Blend Polymer Membrane by UV Radiation The cross-linked PBO(6FDA-HAB)/PES-450C blend polymer membrane was prepared by UV cross-linking the PBO(6FDA-HAB)/PES-450C blend polymer membrane by exposure to UV radiation using 254 nm wavelength UV light generated from a UV lamp with 1.9 cm (0.75 inch) distance from the membrane surface to the UV lamp and a radiation time of 20 min at 50° C. The UV lamp described here is a low pressure, mercury arc immersion UV quartz 12 watt lamp with 12 watt power supply from Ace Glass Incorporated.

Example 8

$CO_2/CH_4$ Separation Performance of PBO(6FDA-HAB)/PES-450C Blend Polymer Membrane and Cross-Linked PBO(6FDA-HAB)/PES-450C Blend Polymer Membrane The PBO(6FDA-HAB)/PES-450C blend polymer membrane and the cross-linked PBO(6FDA-HAB)/PES-450C blend polymer membrane were tested for $CO_2/CH_4$ separation under testing pressure of 690 kPa (100 psig) and temperature of 50° C. (Table 2). It can be seen from Table 2 that the cross-linked PBO(6FDA-HAB)/PES-450° C. blend polymer membrane has significantly increased $CO_2/CH_4$ selectivity compared to the un-cross-linked PBO(6FDA-HAB)/PES-450° C. blend polymer membrane. The $CO_2$ permeability of the cross-linked PBO(6FDA-HAB)/PES-450° C. blend polymer membrane is still higher than 300 Barrer.

TABLE 2

Pure gas permeation test results of PBO(6FDA-HAB)/PES-450C blend polymer membrane and cross-linked PBO(6FDA-HAB)/PES-450C blend polymer membrane for $CO_2/CH_4$ Separation[a]

| Membrane | $P_{CO2}$ (Barrer) | $\alpha_{CO2/CH4}$ |
|---|---|---|
| PBO(6FDA-HAB)/PES-450C | 539.5 | 20.0 |
| Cross-linked PBO(6FDA-HAB)/PES-450C | 370.1 | 28.7 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Example 9

$CO_2/CH_4$ Separation Performance of PBO(6FDA-HAB)/PES-400° C. Blend Polymer Membrane and Cross-Linked PBO(6FDA-HAB)/PES-400C Blend Polymer Membrane The PBO(6FDA-HAB)/PES-400° C. blend polymer membrane and the cross-linked PBO(6FDA-HAB)/PES-400C blend polymer membrane were tested for $CO_2/CH_4$ separation under testing pressure of 690 kPa (100 psig) and temperature of 50° C. (Table 3). It can be seen from Table 3 that the cross-linked PBO(6FDA-HAB)/PES-400C blend polymer membrane has dramatically increased $CO_2/CH_4$ selectivity without a significant decrease in $CO_2$ permeability compared to the un-cross-linked PBO(6FDA-HAB)/PES- 400° C. blend polymer membrane. This cross-linked PBO (6FDA-HAB)/PES-400C blend polymer membrane with high $CO_2/CH_4$ selectivity is a good candidate membrane for $CO_2/CH_4$ separation application.

TABLE 3

Pure gas permeation test results of PBO(6FDA-HAB)/PES-400C blend polymer membrane and cross-linked PBO(6FDA-HAB)/PES-400C blend polymer membrane for $CO_2/CH_4$ Separation[a]

| Membrane | $P_{CO2}$ (Barrer) | $\alpha_{CO2/CH4}$ |
|---|---|---|
| PBO(6FDA-HAB)/PES-400C | 74.5 | 28.8 |
| Cross-linked PBO(6FDA-HAB)/PES-400C | 59.1 | 41.9 |

[a]$P_{CO2}$ and $P_{CH4}$ were tested at 50° C. and 690 kPa (100 psig);
1 Barrer = $10^{-10}$ cm$^3$(STP)·cm/cm$^2$·sec·cmHg.

Example 10

Synthesis of Poly(ODPA-APAF) Polyimide

The aromatic poly[4,4'-oxydiphthalic anhydride-2,2-bis (3-amino-4-hydroxyphenyl)-hexafluoropropane] (poly (ODPA-APAF)) polyimide containing pendent —OH functional groups ortho to the heterocyclic imide nitrogen in the polymer backbone was synthesized from 4,4'-oxydiphthalic anhydride (ODPA) and 2,2-bis(3-amino-4-hydroxyphenyl)-hexafluoropropane (APAF) in NMP polar solvent by a two-step process involving the formation of the poly(amic acid) followed by a solution imidization process. Acetic anhydride was used as the dehydrating agent and pyridine was used as the imidization catalyst for the solution imidization reaction. For example, a 250 mL three-neck round-bottom flask equipped with a nitrogen inlet and a mechanical stirrer was charged with 10.0 g (27.3 mmol) of APAF and 20 mL of NMP. Once HAB was fully dissolved, a solution of ODPA (8.88 g, 27.3 mmol) in 35 mL of NMP was added to the APAF solution in the flask. The reaction mixture was mechanically stirred for 24 hours at ambient temperature to give a viscous poly(amic acid) solution. Then 11.1 g of acetic anhydride in 10 mL of NMP was added slowly to the reaction mixture under stirring followed by the addition of 8.6 g of pyridine in 10 mL of NMP to the reaction mixture. The reaction mixture was mechanically stirred for an additional 1 hour at 80° C. to yield the poly(ODPA-APAF) polyimide. The poly(ODPA-APAF) polyimide product in a fine fiber form was recovered by slowly precipitating the reaction mixture into a large amount of methanol. The resultant poly(ODPA-APAF) polyimide fibers were then thoroughly rinsed with methanol and dried in a vacuum oven at 150° C. for 24 hours.

Example 11

Preparation of Blend Polymer Membrane from Poly(ODPA-APAF) Polyimide and Polyvinylpyrrolidone (PVP) (Abbreviated as Poly(ODPA-APAF)/PVP)

The poly(ODPA-APAF)/PVP blend polymer membrane was prepared using similar procedures as described in Example 2, but the molar ratio of poly(ODPA-APAF)/PVP is 4:1.

Example 12

Preparation of Polybenzoxazole/PVP Blend Polymer Membrane (PBO(ODPA-APAF)/PVP-450C) from Poly(ODPA-APAF)/PVP Blend Polymer Membrane by Heat Treatment Poly(ODPA-APAF)/PVP blend polymer membrane was thermally heated from 50° C. to 450° C. at a heating rate of 5° C./min under $N_2$ flow. The membrane was hold for 1 hour at 450° C. and then cooled down to 50° C. at a heating rate of 5° C./min under $N_2$ flow to yield polybenzoxazole/PVP blend polymer membrane (PBO(ODPA-APAF)/PVP-450C).

Example 13

Preparation of Poly(ODPA-APAF) Pure Polyimide Membrane

The poly(ODPA-APAF) pure polymer membrane was prepared as follows: 4.0 g of poly(ODPA-APAF) polyimide synthesized in Example 10 was dissolved in a solvent mixture of 12.0 g of NMP and 12.0 g of 1,3-dioxolane. The mixture was mechanically stirred for 2 hours to form a homogeneous casting dope. The resulting homogeneous casting dope was allowed to degas overnight. The poly(ODPA-APAF) pure polymer membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form poly(ODPA-APAF) pure polymer membrane.

Example 14

Preparation of Polybenzoxazole Polymer Membrane (PBO(ODPA-APAF)-450C) from Poly(ODPA-APAF) Pure Polymer Membrane by Heat Treatment The poly(ODPA-APAF) pure polymer membrane was thermally heated from 50° C. to 450° C. at a heating rate of 5° C./min under $N_2$ flow. The membrane was hold for 1 h at 450° C. and then cooled down to 50° C. at a heating rate of 5° C./min under $N_2$ flow to yield polybenzoxazole pure polymer membrane (PBO(ODPA-APAF)-450C).

Example 15

$CO_2/CH_4$ Separation Performance of PBO(ODPA-APAF)/PVP-450C Blend Polymer Membrane and PBO(ODPA-APAF)-450C Pure Polymer Membrane The PBO(ODPA-APAF)-450C/PVP-450C blend polymer membrane and PBO(ODPA-APAF)-450C pure polymer membrane were tested for $CO_2/CH_4$ separation under testing pressure of 690 kPa (100 psig) and temperature of 50° C. (Table 4). It can be seen from Table 4 that the PBO(ODPA-APAF)-450C/PVP-450C blend polymer membrane showed both higher $CO_2$ permeability ($P_{CO2}$=678 Barrer at 50° C. testing temperature) and higher $CO_2/CH_4$ selectivity (24.2 at 50° C. testing temperature) than the PBO(ODPA-APAF)-450C pure polymer membrane with $P_{CO2}$ of 545 Barrer and $\alpha_{CO2/CH4}$ of 22.0. These results suggest that the introduction of a certain amount of PVP polymer to the PBO polymer membrane can improve the separation performance of the PBO polymer membrane.

TABLE 4

Pure gas permeation test results of PBO(ODPA-APAF)/PVP-450C blend polymer membrane and PBO(ODPA-APAF)-450C pure polymer membrane for $CO_2/CH_4$ Separation[a]

| Membrane | $P_{CO2}$ (Barrer) | $\alpha_{CO2/CH4}$ |
|---|---|---|
| PBO(ODPA-APAF)-450C | 544.9 | 22.0 |
| PBO(ODPA-APAF)/PVP-450C | 678.1 | 24.2 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Example 16

Preparation of Cross-Linked Polybenzoxazole/PVP Blend Polymer Membrane (Cross-Linked PBO (ODPA-APAF)/PVP-450C) from PBO(ODPA-APAF)/PVP-450C Blend Polymer Membrane by Uv Radiation The cross-linked PBO(ODPA-APAF)/PVP-450C blend polymer membrane was prepared by UV cross-linking the PBO(ODPA-APAF)/PVP-450C blend polymer membrane by exposure to UV radiation using 254 nm wavelength UV light generated from a UV lamp with 1.9 cm (0.75 inch) distance from the membrane surface to the UV lamp and a radiation time of 20 min at 50° C. The UV lamp described here is a low pressure, mercury arc immersion UV quartz 12 watt lamp with 12 watt power supply from Ace Glass Incorporated.

Example 17

$CO_2/CH_4$ Separation Performance of PBO(ODPA-APAF)/PVP-450C Blend Polymer Membrane and Cross-Linked PBO(ODPA-APAF)/PVP-450C Blend Polymer Membrane The PBO(ODPA-APAF)-450C/PVP-450C blend polymer membrane and the cross-linked PBO(ODPA-APAF)/PVP-450C blend polymer membrane were tested for $CO_2/CH_4$ separation under a testing pressure of 690 kPa (100 psig) and temperature of 50° C. (Table 5). It can be seen from Table 5 that the cross-linked PBO(ODPA-APAF)/PVP-450C blend polymer membrane showed significantly higher $CO_2/CH_4$ selectivity than the un-cross-linked PBO(ODPA-APAF)-450C/PVP-450C blend polymer membrane. The $CO_2$ permeability of the cross-linked PBO(ODPA-APAF)-450C/PVP-450° C. blend polymer membrane is still higher than 500 Barrer.

TABLE 5

Pure gas permeation test results of PBO(ODPA-APAF)/PVP-450C blend polymer membrane and cross-linked PBO(ODPA-APAF)/PVP-450C blend polymer membrane for $CO_2/CH_4$ Separation[a]

| Membrane | $P_{CO2}$ (Barrer) | $\alpha_{CO2/CH4}$ |
|---|---|---|
| PBO(ODPA-APAF)/PVP-450C | 678.1 | 24.2 |
| Cross-linked PBO(ODPA-APAF)/PVP-450C | 578.1 | 32.5 |

[a]$P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

The invention claimed is:

1. A process for making a blend polymer membrane consisting of synthesizing a first glassy polymer wherein said first glassy polymer is an aromatic polyimide comprising pendent functional groups ortho to heterocyclic imide nitrogen in a polymer backbone of said aromatic polyimide; fabricating a blend polymer membrane from said first glassy polymer and a second glassy polymer, different from said first glassy polymer; and converting the blend polymer membrane to a thermally rearranged blend polymer membrane by heating said blend polymer membrane at a temperature from about 300 to 600° C. such that under operating conditions of a separation using the blend polymer membrane the operating temperature is lower than the glass transition temperatures of both glassy polymers of the blend polymer membrane wherein said blend polymer membrane fabricated from said first glassy polymer and said second glassy polymer by heat treatment to a crosslinking step.

2. The process of claim 1 wherein said crosslinking step comprises subjecting said blend polymer membrane to UV radiation or reaction with a chemical crosslinking composition.

3. The process of claim 1 wherein said first glassy polymer comprises a plurality of first repeating units of a formula (I), wherein said formula (I) is:

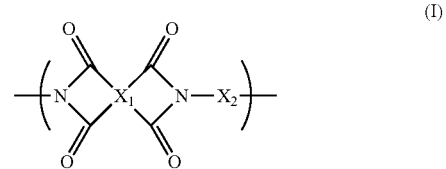

where —$X_1$— of said formula (I) is selected from the group consisting of

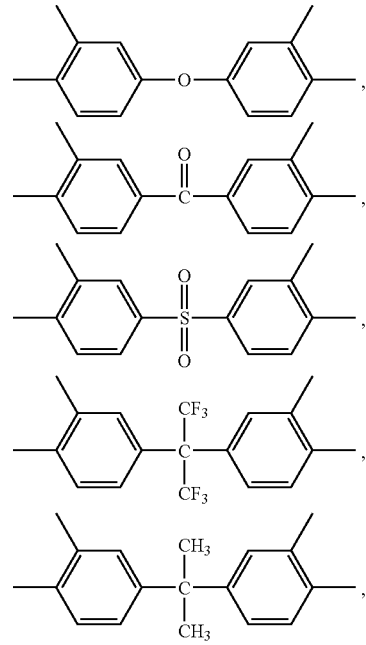

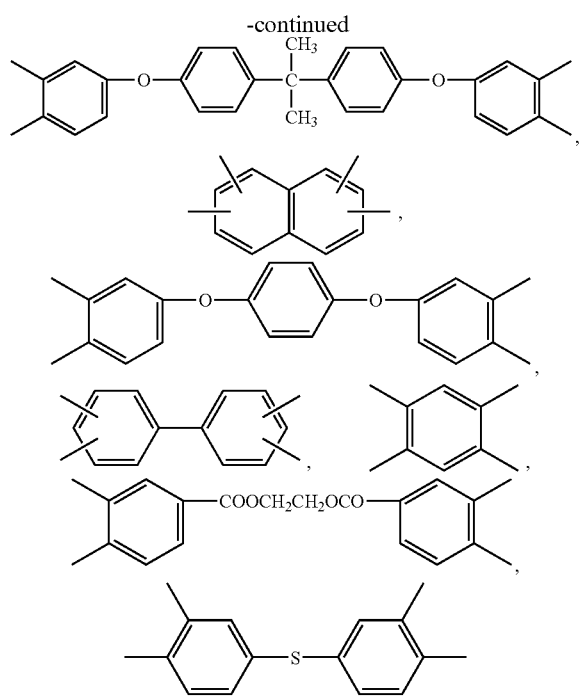

and mixtures thereof, —X$_2$— of said formula (I) is selected from the group consisting of

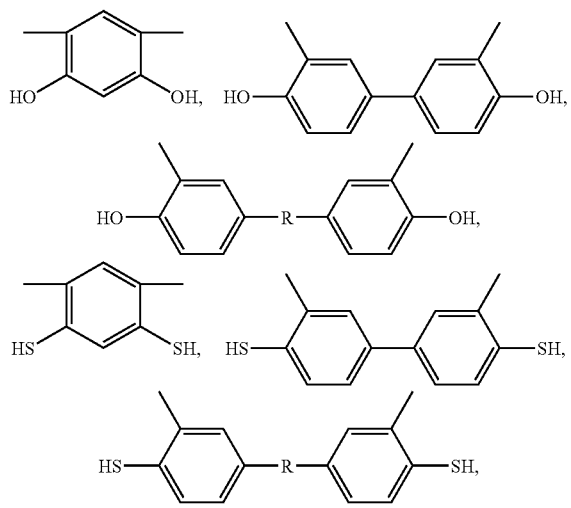

and mixtures thereof, and —R— is selected from the group consisting of

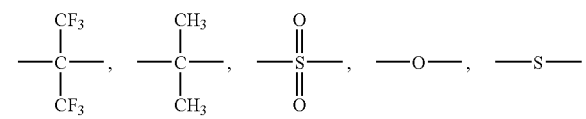

and mixtures thereof.

4. The process of claim 1 wherein said first glassy polymer is a UV cross-linkable polyimide with formula (I), wherein said formula (I) is:

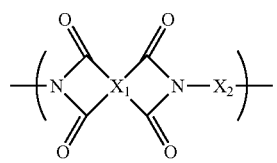

where —X$_1$— of said formula (I) is selected from the group consisting of

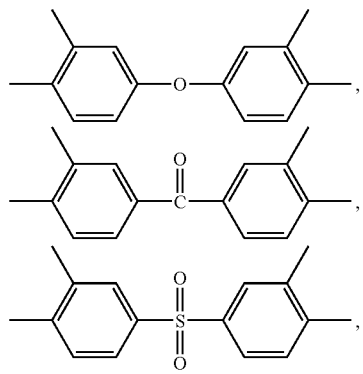

and mixtures thereof, —X$_2$— of said formula (I) is selected from the group consisting of

[same structures as column 1, positions 35-50]

and mixtures thereof, and —R— is selected from the group consisting of

[same R groups as column 1]

and mixtures thereof.

5. The process of claim 1 wherein said second glassy polymer is selected from the group consisting of polysulfones, sulfonated polysulfones, polyethersulfones, sulfonated polyethersulfones, polyetherimides, or polyimides including poly (3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), and poly(3,3',4,4'-diphenylsulfone tetracarboxylic dianhydride-pyromellitic dianhydride-3,3',5,5'-tetramethyl-4,4'-methylene dianiline) (poly(DSDA-PMDA-TMMDA.

6. The process of claim 1 wherein said first glassy polymer is selected from the group consisting of poly[2,2'-bis-(3,4-dicarboxyphenyl) hexafluoropropane dianhydride-2,2-bis(3-amino-4-hydroxyphenyl)-hexafluoropropane] (poly(6FDA-APAF)), poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly(BTDA-HAB)), poly[4,4'-oxydiphthalic anhydride-2,2-bis(3-amino-4-hydroxyphenyl)-hexafluoropropane] (poly(ODPA-APAF)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-3,3'-dihydroxy-4,4'-diamino-biphenyl) (poly(DSDA-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), poly[2,2'-bis-(3,4-dicarboxyphenyl) hexafluoropropane dianhydride-3,3'-dihydroxy-4,4'-diamino-biphenyl] (poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

7. The process of claim 1 wherein said second glassy polymer is selected from the group consisting of polysulfones; sulfonated polysulfones; polyethersulfones; sulfonated polyethersulfones; polyvinylpyrrolidones; polyetherimides; cellulosic polymers; polyamides; polyimides; polyamide/imides; polyketones, polyether ketones; poly(vinyl amides), poly(benzobenzimidazole); polyhydrazides; polyoxadiazoles; polytriazoles; polycarbodiimides; polyphosphazines; and polymers of intrinsic microporosity.

8. The process of claim 1 wherein said blend polymer membrane has a structure selected from the group consisting of a nonporous or porous symmetric structure, an asymmetric structure having a thin nonporous or a porous selective layer supported on top of a porous support layer, and an asymmetric structure having a thin nonporous or porous selective layer made from the blend polymers supported on top of a porous support layer made from a different polymer material or an inorganic material.

* * * * *